(12) United States Patent
Lim (10) Patent No.: US 7,879,252 B1
(45) Date of Patent: Feb. 1, 2011

(54) FUNCTIONAL COTTON SPRAY COMPOSITION, METHOD FOR PRODUCING THE SAME, AND BUILDING MATERIAL USING THE SAME

(76) Inventor: Chang Ha Lim, 604-202 Poonglim I-Won APT., Songdo-dong, Yeonsu-gu, Incheon-si (KR)

( * ) Notice: Subject to any disclaimer, the term of this patent is extended or adjusted under 35 U.S.C. 154(b) by 0 days.

(21) Appl. No.: 12/537,902

(22) Filed: Aug. 7, 2009

(51) Int. Cl.
*E04B 1/74* (2006.01)
*E04B 1/92* (2006.01)
*C09D 197/02* (2006.01)

(52) U.S. Cl. ............... 252/62; 106/15.05; 106/18.11; 106/164.01; 106/164.5; 106/204.2; 106/731; 106/805; 252/70; 252/71; 252/601; 428/532; 428/534; 428/535; 428/537.1

(58) Field of Classification Search .......... 106/15.05, 106/18.11, 164.01, 164.5, 204.2, 731, 805; 252/62, 70, 71, 601; 428/532, 534, 535, 428/537.1
See application file for complete search history.

(56) References Cited

U.S. PATENT DOCUMENTS

| | | | |
|---|---|---|---|
| 2,014,947 A * | 9/1935 | McCulloch et al. | 19/0.46 |
| 3,753,751 A * | 8/1973 | Shannon | 106/795 |
| 5,516,580 A * | 5/1996 | Frenette et al. | 442/153 |
| 5,620,509 A * | 4/1997 | Tampio | 106/162.5 |
| 6,379,454 B1 * | 4/2002 | Fellert | 106/698 |
| 2006/0008496 A1 * | 1/2006 | Kulkarni et al. | 424/412 |
| 2006/0046594 A1 * | 3/2006 | Starrett | 442/136 |

FOREIGN PATENT DOCUMENTS

| | | | |
|---|---|---|---|
| DE | 102008038623 A1 * | 2/2010 | |
| JP | 58-222161 A * | 12/1983 | |
| WO | WO98/05492 A1 * | 2/1998 | |

OTHER PUBLICATIONS

Derwent-Acc-No. 2010-B67846, abstract of Korean Patent Specification No. KR 2010011473 A (Feb. 2010).*

* cited by examiner

*Primary Examiner*—Anthony J Green
(74) *Attorney, Agent, or Firm*—Park & Associates IP Law LLC (57) ABSTRACT

A functional cotton spray composition includes: 100 parts by weight of cotton fibers having a length of 3 mm or less; 0.5 to 5 parts by weight of a phase change material; 0.5 to 1 parts by weight of a titanium dioxide photoactive catalyst; 0.5 to 2 parts by weight of at least one natural pigment selected from the group consisting of a pine needle powder, a green tea powder, a mugwort powder, an indigo plant powder, a gardenia powder, a charcoal powder and a yellow soil powder; 0.5 to 5 parts by weight of a dispersant; 5 to 20 parts by weight of a viscosity improver; 10 to 20 parts by weight of an organic flame retardant; 5 to 15 parts by weight of an inorganic flame retardant; 0.5 to 3 parts by weight of an antimicrobial and antifungal agent; and 300 to 600 parts by weight of viscosity-controlling water.

17 Claims, 2 Drawing Sheets

FUNCTIONAL COTTON SPRAY COMPOSITION, METHOD FOR PRODUCING THE SAME, AND BUILDING MATERIAL USING THE SAME

FIELD OF THE INVENTION

The present invention relates to a functional cotton spray composition which is mainly composed of short cotton fibers generated when processing an environmentally-friendly raw cotton material or cotton fibers and which is added with not only a microcapsule type phase change material capable of effectively storing the thermal energy transferred to the cotton spray composition during a heating or cooling process so that a heat retention effect or a cold energy retention effect can last for more than a specified time period after the heating or cooling process but also an environmentally-friendly material harmless to human bodies and capable of creating a pleasant indoor environment, when the cotton spray composition is used as a construction-purpose spray material or a building material. The present invention is also directed to a method for producing a functional cotton spray composition and a building material using a functional cotton spray composition.

BACKGROUND OF THE INVENTION

As construction-purpose interior finishing materials, there are generally known a stone-based spray-coating material obtained by mixing a natural stone aggregate and a synthetic resin emulsion, an organic spray-coating material such as an acryl resin, an epoxy resin or the like, and an inorganic spray-coating material composed of rock wool, glass wool or the like. Such spray-coating materials are, however, insufficient in deriving a beautiful color required in a finishing material and demonstrating a compact shape and an interior decoration effect. The spray-coating materials are harmful to human bodies and cannot be regenerated. When incinerated or buried, the spray-coating materials may become a cause of environmental pollution. For these reasons, it is the recent tendency to avoid using the spray-coating materials mentioned above and to replace them with a nature-friendly product.

Along with the recent change in the housing culture and the living environment, there is an increasing demand for improved pleasantness of an indoor environment. A need exists to develop a convergence technology that assists in saving energy and keeping an indoor environment pleasant. Examples of such a technology include a cooling and heating technology and a thermal insulation technology.

In the hot-air heating and the hot-water radiation heating employed in most houses, the heat radiation from an indoor resident is reduced by increasing the surface temperature of an interior decoration material. In order to assure pleasant radiation heating, it is necessary to uniformly supply heat into a room so that the difference in temperature between the interior decoration material and the indoor air can be kept small. This may possibly lead to an overheating problem and a heat loss caused by ventilation or door opening and closing.

In case of cooling, failure to evenly control an indoor temperature results in an increased sense of unpleasantness. If a cooling device is heavily operated to avoid such a situation, it becomes difficult to save energy.

Examples of the thermal insulation material used in a building include expanded polystyrene foam, urethane foam and glass wool, the use of which has assisted in increasing the sense of pleasantness, reducing dew condensation and eventually improving the living environment. Since these thermal insulation materials serve merely to cut off heat transfer, there has existed a demand for a functional building material that can enjoy increased heat transfer efficiency.

As a solution to these technical problems, Korean Patent No. 0430839 discloses a sound-absorbing heat-insulating short-fiber composition comprising: 100 parts by weight of circular spheroid fibers with a diameter of 1 to 5 mm obtained by processing short waste fibers of 0.1 to 0.3 mm in length wasted in a fiber textile production process; 10 to 60 parts by weight of an inorganic flame-retardant; 10 to 70 parts by weight of an inorganic binding and curing agent; 10 to 40 parts by weight of an organic binder; 0.2 to 20 parts by weight of an inorganic pigment as a coloring agent; 0.5 to 3 parts by weight of an antimicrobial and antifungal agent; and 100 to 300 parts by weight of viscosity-controlling water based on the total weight of the above-noted components.

The sound-absorbing heat-insulating short-fiber composition cited above contains some nature-friendly additives and enjoys a sound-absorbing and heat-insulating effect basically required in a building material. Due to the absence of functional additives, however, the short-fiber composition fails to provide a satisfactory cooling or heating effect when it is used as a building material in the wall, ceiling or floor. Although some of the additives contained in the short-fiber composition are environmentally friendly, most of them are synthetic materials harmful to human bodies. Thus, it is still unsatisfactory to use the short-fiber composition as a building material for creating a pleasant living environment.

For the reasons stated above, there has existed a great demand to develop a cotton spray composition added with functional and environmentally-friendly substances capable of maximizing a cooling and heating effect and creating a pleasant indoor environment.

SUMMARY OF THE INVENTION

In view of the above-noted problems, it is an object of the present invention to provide a functional cotton spray composition which is composed of short cotton fibers obtained as a by-product when processing a raw cotton or cotton fibers and which is added with not only a phase change material capable of effectively storing the thermal energy transferred to the cotton spray composition during a heating or cooling process so that a heat retention effect or a cold energy retention effect can last for more than a specified time period after the heating or cooling process but also an environmentally-friendly material capable of creating a pleasant living environment when the cotton spray composition is used as a building material in the ceiling, wall or floor of a building.

Another object of the present invention is to provide a method for producing a functional cotton spray composition and a building material using a functional cotton spray composition.

According to one aspect of the present invention, there is provided a functional cotton spray composition, comprising: 100 parts by weight of cotton fibers having a length of 3 mm or less; 0.5 to 5 parts by weight of a microcapsule type phase change material; 0.5 to 1 parts by weight of a titanium dioxide photoactive catalyst; 0.5 to 2 parts by weight of at least one natural pigment selected from the group consisting of a pine needle powder, a green tea powder, a mugwort powder, an indigo plant powder, a gardenia powder, a charcoal powder and a yellow soil powder; 0.5 to 5 parts by weight of a dispersant; 5 to 20 parts by weight of a viscosity improver; 10 to 20 parts by weight of an organic flame retardant; 5 to 15 parts by weight of an inorganic flame retardant; 0.5 to 3 parts by weight of an antimicrobial and antifungal agent; and 300 to 600 parts by weight of viscosity-controlling water.

The composition may further comprise 0.5 to 2 parts by weight of at least one substance selected from the group consisting of jasmine fragrance oil, green tea fragrance oil, lemon fragrance oil, baby powder fragrance oil and lavender fragrance oil.

The composition may further comprise 5 to 10 parts by weight of an inorganic binding and curing agent.

The composition may further comprise 5 to 10 parts by weight of at least one substance selected from the group consisting of quartz monzonite, illite, yellow soil, charcoal, perlite and vermiculite.

According to another aspect of the present invention, there is provided a method for producing a functional cotton spray composition, comprising:

a first step in which 100 parts by weight of cotton fibers having a length of 3 mm or less are prepared by processing a raw cotton material or by collecting in a vinyl pack through a pipe, and then assorting on a color-by-color basis, fiber scraps generated in a cotton fiber processing process;

a second step in which 0.5 to 5 parts by weight of a microcapsule type phase change material and 0.5 to 1 parts by weight of a titanium dioxide photoactive catalyst are added to and mixed with the cotton fibers;

a third step in which 0.5 to 2 parts by weight of at least one natural pigment selected from the group consisting of a pine needle powder, a green tea powder, a mugwort powder, an indigo plant powder, a gardenia powder, a charcoal powder and a yellow soil powder is added to and mixed with the cotton fibers;

a fourth step in which 0.5 to 5 parts by weight of a dispersant and 5 to 20 parts by weight of a viscosity improver are added to the cotton fibers to promote dispersion and binding of the cotton fibers;

a fifth step in which 10 to 20 parts by weight of an organic flame retardant and 5 to 15 parts by weight of an inorganic flame retardant are added to the cotton fibers;

a sixth step in which 0.5 to 3 parts by weight of an antimicrobial and antifungal agent as a functional additive is added to the cotton fibers; and a seventh step in which the substances prepared and added in the first through sixth steps and 300 to 600 parts by weight of purified water are put into a kneader, thoroughly kneaded at a kneading speed of 50 to 500 rpm for 20 to 45 minutes, and left alone to age at a temperature of 25 to 50° C. for 1 to 5 hours.

The method may further comprise, between the third and fourth steps, a step in which 0.5 to 2 parts by weight of at least one substance selected from the group consisting of jasmine fragrance oil, green tea fragrance oil, lemon fragrance oil, baby powder fragrance oil and lavender fragrance oil is added to and mixed with the cotton fibers.

The method may further comprise, between the sixth and seventh steps, a step in which 5 to 10 parts by weight of an inorganic binding and curing agent for binding and curing the cotton spray composition is added to and mixed with the cotton fibers.

The method may further comprise, after the curing agent adding step, a step in which 5 to 10 parts by weight of at least one substance selected from the group consisting of quartz monzonite, illite, yellow soil, charcoal, perlite and vermiculite is added to and mixed with the cotton fibers to generate far infrared rays helpful to a human body and capable of neutralizing toxic substances.

According to a further aspect of the present invention, there is provided a building material provided with a cotton spray composition, wherein the cotton spray composition comprises: 100 parts by weight of cotton fibers having a length of 3 mm or less; 0.5 to 5 parts by weight of a microcapsule type phase change material; 0.5 to 1 parts by weight of a titanium dioxide photoactive catalyst; 0.5 to 2 parts by weight of at least one natural pigment selected from the group consisting of a pine needle powder, a green tea powder, a mugwort powder, an indigo plant powder, a gardenia powder, a charcoal powder and a yellow soil powder; 0.5 to 5 parts by weight of a dispersant; 5 to 20 parts by weight of a viscosity improver; 10 to 20 parts by weight of an organic flame retardant; 5 to 15 parts by weight of an inorganic flame retardant; 0.5 to 3 parts by weight of an antimicrobial and antifungal agent; and 300 to 600 parts by weight of viscosity-controlling water.

In the building material, the cotton spray composition may further comprise 0.5 to 2 parts by weight of at least one substance selected from the group consisting of jasmine fragrance oil, green tea fragrance oil, lemon fragrance oil, baby powder fragrance oil and lavender fragrance oil.

In the building material, the cotton spray composition may further comprise 5 to 10 parts by weight of an inorganic binding and curing agent.

In the building material, the cotton spray composition may further comprise 5 to 10 parts by weight of at least one substance selected from the group consisting of quartz monzonite, illite, yellow soil, charcoal, perlite and vermiculite.

In the building material, the cotton spray composition may be spray-coated on a surface of the building material.

In the building material, the cotton spray composition may be plastered on a surface of the building material.

In the building material, the cotton spray composition may be filled inside the building material.

The building material may be formed by extruding or injecting the cotton spray composition.

In the building material, the cotton spray composition may be spray-coated on a surface of the building material.

With the present invention, the functional cotton spray composition contains a microcapsule type phase change material. In case where the cotton spray composition is applied to the wall, ceiling or floor of a building, the phase change material contained in the cotton spray composition is changed from a solid phase to a liquid phase under a high temperature condition as in summer, thereby absorbing heat from the ambient air and creating a cool environment. Under a low temperature condition as in winter, the phase change material is changed from a liquid phase to a solid phase, thereby radiating heat to the ambient air and creating a warm environment. In this manner, the cotton spray composition serves to store or radiate heat depending on the change in the thermal condition. Thus, the cotton spray composition shows drastically-improved heat insulation performance and effectively reduces the change in the indoor air temperature, consequently keeping the indoor air temperature as close to a desired temperature as possible. This makes it possible to save the energy required in heating or cooling a room and also to create a highly pleasant living environment.

Addition of the titanium dioxide photoactive catalyst makes it possible to adsorb the pollutants contained in the indoor air and to purify the indoor air by oxidizing and decomposing the pollutants with its strong antimicrobial, sterilizing and deodorizing power. Addition of the natural pigment such as a pine needle powder, a green tea powder, a mugwort powder, an indigo plant powder, a gardenia powder, a charcoal powder or a yellow soil powder provides an effect of keeping a human body free from harmful substances which may cause a new-house syndrome or an atopic dermatitis and an effect of purifying the indoor air.

Use of the present cotton spray composition in the building material makes it possible to demonstrate the natural texture inherent in the cotton fibers. Addition of the functional additives makes it possible to provide a building material having the effects of beautiful finishing treatment, illumination, humidity control and flame resistance.

DETAILED DESCRIPTION OF THE INVENTION

A functional cotton spray composition in accordance with the present invention will now be described in detail.

The present cotton spray composition is mainly composed of short cotton fibers with a length of 3 mm or less generated when processing a raw cotton material or cotton fibers and is added with a dispersant, a viscosity improver, a flame retardant, other functional additives and viscosity-controlling water.

More specifically, the present cotton spray composition includes: 100 parts by weight of cotton fibers having a length of 3 mm or less; 0.5 to 5 parts by weight of a microcapsule type phase change material; 0.5 to 1 parts by weight of a titanium dioxide photoactive catalyst; 0.5 to 2 parts by weight of at least one natural pigment selected from the group consisting of a pine needle powder, a green tea powder, a mugwort powder, an indigo plant powder, a gardenia powder, a charcoal powder and a yellow soil powder; 0.5 to 5 parts by weight of a dispersant; 5 to 20 parts by weight of a viscosity improver; 10 to 20 parts by weight of an organic flame retardant; 5 to 15 parts by weight of an inorganic flame retardant; 0.5 to 3 parts by weight of an antimicrobial and antifungal agent; and 300 to 600 parts by weight of viscosity-controlling water.

The present cotton spray composition further includes 0.5 to 2 parts by weight of at least one substance selected from the group consisting of jasmine fragrance oil, green tea fragrance oil, lemon fragrance oil, baby powder fragrance oil and lavender fragrance oil.

The present cotton spray composition further includes 5 to 10 parts by weight of an inorganic binding and curing agent, and 5 to 10 parts by weight of at least one substance selected from the group consisting of quartz monzonite, illite, yellow soil, charcoal, perlite and vermiculite.

The phase change material used in the present invention is contained within microcapsules. Examples of the phase change material include tetradecane, eicosane, octadecane, hexadecane, propion amide, naphthalene, acetamide, stearic acid, polyglycol, wax, palmitic acid, myristic acid, lignoceric acid, camphene, 3-heptanecanone, polyethylene glycol, cyanamide, lauric acid, hexadecanone, capric acid and caprylic acid, one or more of which may be used independently or in combination. The microcapsules are made of a polymeric material, examples of which include an acryl resin, a melamine resin and a urea resin. It is preferred that the microcapsules are 40 to 50 μm in diameter.

In the present invention, it is preferred that the memory temperature of the phase change material is set within a broad range of from −20° C. to 120° C.

The phase change material refers to a substance that stores energy or keeps a temperature constant using a latent heat absorption and radiation effect. In this regard, the term "latent heat" means the heat absorbed or radiated during the change of phase from solid to liquid or vice versa at a constant temperature and pressure. Typically, the latent heat is far greater than the sensible heat absorbed or radiated during no change of phase.

Accordingly, the phase change material ensures that the ambient temperature is gradually increased when the ambient air is hot, while the ambient temperature is gradually reduced when the ambient air is cold. In this manner, the phase change material is capable of keeping the indoor environment cool for a long time when the ambient temperature is high as in summer and also capable of keeping the indoor environment warm for a long time when the ambient temperature is low as in winter.

More specifically, if a specified temperature is memorized in the phase change material, the phase change material undergoes a change of phase at that temperature and radiates or absorbs heat, thereby increasing or reducing the ambient temperature. In case where the phase change material is moved from a cool place to a hot place in summer, the phase of the phase change material is changed from solid to liquid so that the phase change material can absorb heat present in the ambient air and create a cool environment. In the event that the phase change material is moved from a warm place to a cold place in winter, the phase of the phase change material is changed from liquid to solid so that the phase change material can radiate heat toward the ambient air and create a warm environment.

When the cotton spray composition containing such a phase change material is spray-coated on the wall, ceiling or floor of a building or is used in manufacturing various kinds of building materials, the cotton spray composition is able to effectively store the thermal energy transferred to the cotton spray composition during a heating or cooling process so that a heat retention effect or a cold energy retention effect can last for more than a specified time period after the heating or cooling process. This makes it possible to create a pleasant indoor environment.

If the content of the microcapsule type phase change material is less than 0.5 parts by weight, the heat storing property inherent in the phase change material may be deteriorated. In contrast, if the content of the phase change material is greater than 5 parts by weight, the cotton spray composition may become high-priced due to the costliness of the phase change material. Another disadvantage is that the phase change material does not satisfactorily cohere with the cotton fibers and other additives, which may possibly reduce the physical property of the cotton spray composition.

Titanium dioxide, one of the representative raw materials of the photoactive catalyst, is low-priced and superior in durability and wear-resistance. When wasted, titanium dioxide is unlikely to cause secondary pollution. Thus, titanium dioxide is extensively used in paint, textiles, rubber, paper, cosmetics, foodstuff and so forth. As the photoactive catalyst, it may be possible to use titanium dioxide having an anatase type, rutle type or vrookite type crystal structure. However, the photoactive catalyst shall not be limited to titanium dioxide but may be any kind of material insofar as it can serve as the photoactive catalyst.

The photoactive catalyst can adsorb the pollutants contained in the indoor air and also can purify the indoor air by oxidizing and decomposing the pollutants with its strong antimicrobial, sterilizing and deodorizing power.

If the content of the titanium dioxide photoactive catalyst is less than 0.5 parts by weight, the photoactive catalyst may show reduction in the antimicrobial and sterilizing effect by which to decompose bacteria and a virus, the deodorizing effect by which to decompose a bad odor such as a tobacco odor or a food odor, the air purifying effect by which to decompose formaldehyde present within a room, the hydrophobic property by which to allow water or like material to flow down without adhering to the building material and without making water droplets, and the ultraviolet ray cutoff effect. In contrast, if the content of the titanium dioxide photoactive catalyst is greater than 1 part by weight, inefficiency involves in providing the afore-mentioned effects.

As the natural pigment used in the present invention, it is preferable to use a nature-friendly and naturally-occurring substance such as a pine needle powder, a green tea powder, a mugwort powder, an indigo plant powder, a gardenia powder, a charcoal powder and a yellow soil powder, which is free from a new-house syndrome or an atopic dermatitis and useful in purifying the indoor air.

Description will now be made on the pine needle powder, the green tea powder, the mugwort powder, the indigo plant powder, the gardenia powder, the charcoal powder and the yellow soil powder, which are used as the natural pigment in the present invention.

The pine needle is composed of different nutrients such as carbohydrate, protein, vitamin A, vitamin C, vitamin K, chlorophyll, calcium, iron and the like. The pine needle is known as a superior protein source containing eight essential amino acids which cannot be synthesized within a body. In addition, the pine needle serves to rejuvenate the body by lowering the cholesterol value, expanding the peripheral nerves and promoting the secretion of hormones. It is known that the pine needle is very useful to the human body. For example, the pine needle is effective in treating hypertension and myocardial infarction and assists in stabilizing the nerve system and preventing and treating a cold.

The green tea is very useful to the human body and provides various effects, including an anticancer effect, an anti-aging effect, a geriatric disease preventing effect and an inflammation and infection preventing effect. The green tea and the pine needle are used as a natural pigment of green color.

The mugwort contains various kinds of components very useful to the human body and is effective in preventing a cancer. The mugwort is known to play an important role in suppressing the generation and activation of a carcinogenic substance. The mugwort is also used as a natural pigment of green color.

The indigo plant is an annual single-color plant whose leaves are used in extracting an indigo pigment. The indigo plant shows increased color fastness and has long been used in dyeing clothes.

The gardenia contains a reddish yellow pigment, i.e., crotin as carotenoid glycoside which, if hydrolyzed, is decomposed into crocetin and glucose. The gardenia is known to be a nontoxic natural compound and has long been used in coloring foodstuff and dyeing textiles. When used in dyeing, the color of gardenia looks yellowish and has high saturation. Although the color of gardenia is gorgeous in itself, it may be used as a basic color of duplicate dyeing in order to create a green color or a bright red color.

The charcoal has long been used in removing a bad smell or purifying a contaminated air. Thanks to its broad surface area, the charcoal is superior in adsorption power and is known to be excellent in an electromagnetic wave shielding effect, an antimicrobial effect and a humidity control effect. The charcoal powder exhibits high electric resistance and low cohesiveness. As compared to carbon black, the charcoal powder is superior in dispersibility and can be used as a coloring agent in place of the carbon black.

The yellow soil is composed of calcium carbonate, silica, iron oxide, lime, alumina and so forth. Infrared rays are emitted from the yellow soil to promote blood circulation and perspiration. The yellow soil serves to discharge waste matters and heavy metals from the human body and to activate body cells. Furthermore, the yellow soil is superior in an antimicrobial and insect-repellent effect, an antifungal effect and a moisture-removing effect. Moreover, the yellow soil generates negative ions to purify a contaminated air and to decompose or remove cigarette smoke and a foot smell, thereby keeping the indoor air fresh. In addition, the yellow soil is used as a natural pigment and, in recent years, is widely used among the people as a therapeutic agent for an atopic dermatitis.

The cotton spray composition containing the natural substances set forth above is helpful to the human body and provides a health promotion effect and a natural-color-based artistic effect, when applied to a construction-purpose interior or exterior decoration material to be attached to the wall, ceiling or floor of a building.

Figure 1:
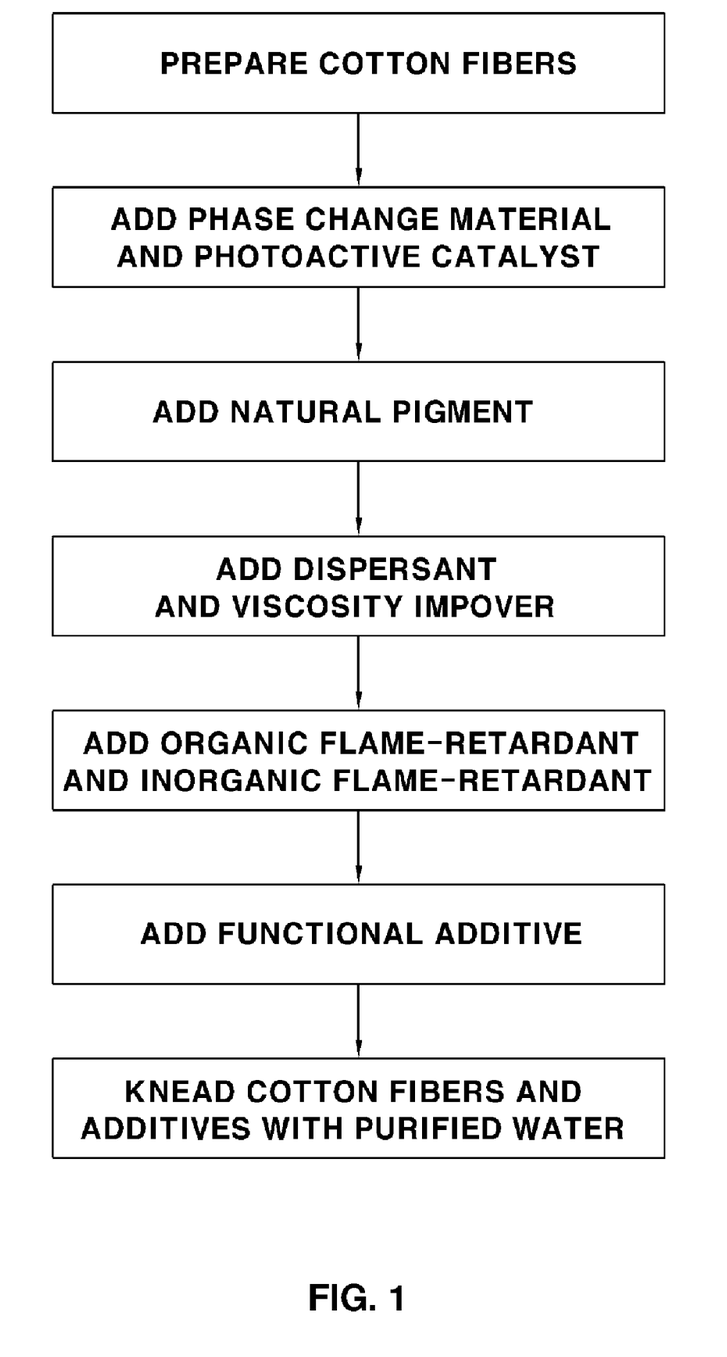
FIG. 1 illustrates a process for production of a functional cotton spray composition in accordance with one embodiment of the present invention.

Referring now to FIG. 1, there is illustrated a process for production of the cotton spray composition in accordance with one embodiment of the present invention. As illustrated in FIG. 1, the cotton spray composition is produced through a series of steps described below.

First Step: Preparation of Short Cotton Fibers

As a main component of the cotton spray composition, short cotton fibers having a length of 3 mm or less are prepared by processing a raw cotton material or by collecting in a vinyl pack through a pipe, and then assorting on a color-by-color basis, fiber scraps generated in a cotton fiber processing process.

The cotton fibers thus prepared are kept homogeneous and clean and are stored in a hermetically sealed state after the volume thereof has been reduced by a compressing machine.

Due to their characteristic tissue, the cotton fibers are highly porous and absorptive and tend to get entangled with one another. In view of this, it is preferred that the cotton fibers have a length of 3 mm or less.

Second Step: Addition of Phase Change Material and Photoactive Catalyst

Then, 0.5 to 5 parts by weight of a microcapsule type phase change material having organic and inorganic coating layers, which is coated with an organic material, e.g., a polymeric material, and then coated with an inorganic material, is added to and mixed with 100 parts by weight of the cotton fibers.

Subsequently or simultaneously, 0.5 to 1 part by weight of a titanium dioxide photoactive catalyst is added to and mixed with the cotton fibers.

Titanium dioxide, one of the representative raw materials of the photoactive catalyst, is low-priced and superior in durability and wear-resistance. When wasted, titanium dioxide is unlikely to cause secondary pollution. Thus, titanium dioxide is extensively used in paint, textiles, rubber, paper, cosmetics, foodstuff and so forth. As the photoactive catalyst, it may be possible to use titanium dioxide having an anatase type, rutle type or vrookite type crystal structure. However, the photoactive catalyst shall not be limited to titanium dioxide but may be any kind of material insofar as it can serve as the photoactive catalyst.

If the cotton spray composition containing the titanium dioxide photoactive catalyst is coated on an object, the photoactive catalyst as ultra fine particles performs a catalytic action upon receiving light energy and adsorbs pollutants present in the indoor air. The photoactive catalyst can oxidize and decompose the pollutants with its antimicrobial, sterilizing and deodorizing power, thus purifying the indoor air. This means that, when applied to a construction-purpose interior or exterior decoration material, the cotton spray composition can purify pollutants and create a pleasant indoor environment.

Third Step: Addition of Natural Pigment 0.5 to 2 parts by weight of at least one natural pigment selected from the group consisting of a pine needle powder, a green tea powder, a mugwort powder, an indigo plant powder, a gardenia powder, a charcoal powder and a yellow soil powder is added to and mixed with the cotton fibers.

The natural pigment is a naturally occurring one extracted from plants and is more nature-friendly than a synthesized one. The natural pigment may further include a cactus (*Opuntia ficus-indica*) powder and other plant powders.

If the cotton spray composition containing the natural pigment is coated on the surface of an object such as an interior decoration building material or the like, it becomes possible to keep the human body free from harmful substances which may cause a new-house syndrome or an atopic dermatitis and also to purify the indoor air.

Additionally and optionally, 0.5 to 2 parts by weight of at least one substance selected from the group consisting of jasmine fragrance oil, green tea fragrance oil, lemon fragrance oil, baby powder fragrance oil and lavender fragrance oil is added to and mixed with the cotton fibers.

The fragrance oil is a naturally occurring one extracted from plants and is more nature-friendly than a synthesized one. The fragrance oil may further include herb fragrance oil and various kinds of other oil.

If the cotton spray composition containing the fragrance oil is coated on the surface of an object such as an interior decoration building material or the like, a subtle perfume is emitted from the cotton spray composition, which assists in creating a pleasant living environment.

Fourth Step: Addition of Dispersant and Viscosity Improver

In order to promote the dispersion and binding of the cotton fibers, 0.5 to 5 parts by weight of a dispersant and 5 to 20 parts by weight of a viscosity improver are added to the cotton fibers.

These additives serve to increase the internal spacing of the cotton fibers and to enhance the binding force between the cotton fibers in the mixing process, so that the natural texture inherent in the cotton fibers can be demonstrated as it stands.

Since the cotton fibers are highly inflammable, there is a need to subject the cotton fibers to an effective flame-retardation treatment complying with the flame-retardation requirements prescribed in the building law.

The flame-retardant added to the cotton spray composition may be either powdery or liquid. Organic and inorganic flame-retardants harmless to the human body are used to provide superior flame-retarding performance.

Fifth Step: Addition of Organic and Inorganic Flame-Retardants

Based on 100 parts by weight of the cotton fibers, 10 to 20 parts by weight of a phosphorus-based flame-retardant exhibiting superior heat resistance is added as the organic flame-retardant and 5 to 15 parts by weight of an antimony-based flame-retardant having a flame-retarding effect is added as the inorganic flame-retardant.

Sixth Step: Addition of Functional Additive

An antimicrobial and antifungal agent is used as the functional additive, the content of which depends on the kind thereof and may be in the range of from 0.5 to 3 parts by weight.

Additionally and optionally, an inorganic binding and curing agent for binding and curing a coated object is used as the functional additive, the content of which depends on the kind thereof and may be in the range of from 5 to 10 parts by weight.

After the curing agent has been added and mixed, 5 to 10 parts by weight of at least one substance selected from the group consisting of quartz monzonite, illite, yellow soil, charcoal, perlite and vermiculite is added to the cotton fibers in order to generate far infrared rays helpful to the human body and capable of neutralizing externally-originating toxic substances. One or more of the substances belonging to this group may be added independently or in combination.

The quartz monzonite is often called a "barley-speckled stone" in the Oriental nations, which term is not a geologically-recognized rock name but is one of the Oriental medicine terms originally used in China. When geologically classified, the quartz monzonite belongs to the class of granite and includes quartz porphyry, feldspar porphyry and granite porphyry.

Speckles of quartz and feldspar are densely dispersed in the quartz monzonite. The common name of quartz monzonite, "barley-speckled stone", appears to come from its pattern in which reddish or white speckles like barley grains are evenly distributed in a base rock of yellowish white color, light yellowish brown color, light gray color, dark green color or light green color.

The quartz monzonite is mainly composed of silica and aluminum oxide and contains a small amount of iron oxide. Quartz monzonite of yellowish white color is known to be a medically effective stone and has long been used as a filtering agent for purifying pills or as an antiphlogistic agent for treating a swelling, a boil and other skin diseases generated on the back. According to "Dongeibogam", a public health manual written by a Korean herbalist, it is said that the quartz monzonite powder is sweet, warm and nontoxic.

The quartz monzonite has 30,000 to 150,000 pores per cubic centimeter and is therefore highly adsorptive. Furthermore, the quartz monzonite contains about 25,000 mineral salts and acts to exchange ions with heavy metals, for the reason of which the quartz monzonite is sometimes used as a remover of noxious metals. It is known that, when heated, the quartz monzonite emits far infrared rays.

Thanks to the features noted above, the quartz monzonite is extensively used in a variety of industrial fields such as a sauna, a tableware industry and a medical instrument industry.

The illite is a mineral of mica family belonging to the monoclinic system. The illite is 1 to 2 in hardness and 2.6 to 2.9 in specific gravity, the streak color of which is white. The chemical composition of illite is expressed by $(K,H_3O)Al_2(Si,Al)_4O_{10}(H_2O,OH)_2$. In view of its chemical ingredients, the illite is similar to muscovite and is a mineral belonging to the same family as hydromuscovite which contains a relatively large amount of $SiO_2$, $MgO$ and $H_2O$ and a small amount of $K_2O$.

There is an opinion that illite is not an independent mineral but a mixed mineral containing other components. The rationale behind this opinion is that illite shows soil-like gloss and differs from an independent mineral in its chemical ingredient and crystalline structure.

The yellow soil refers to a deposit consisting essentially of silt-size particles of 0.002 to 0.005 mm in diameter and is often called "loess". It is known that microorganisms live in the yellow soil and the house built with the yellow soil is cool in summer and warm in winter. Thus the yellow soil is recently spotlighted as an environmentally-friendly building material.

The charcoal refers to a solid article obtained when wood is fired in an air-free atmosphere or in a lean air condition. Typically, hard timbers are used as the wood for the production of charcoal. In Korea, oak tree charcoal is widespread.

There are known various kinds of charcoal production methods. One of them is a kiln method in which a charcoal kiln is built and timbers are fired within the kiln. Just like the yellow soil, the charcoal is recently spotlighted as an environmentally-friendly building material.

The perlite is mainly used in cultivating plants or as a building material. When heated, the perlite is sterilized into a germ-free state with no weed seeds or insects left therein. For that reason, the perlite is preferably used in plant cultivation, particularly in hydroponic culture. In addition, the perlite is widely utilized as a material for sowing and breeding, plug production, transplantation and indoor gardening.

The vermiculite is a mineral belonging to the monoclinic system and having the same crystalline structure as mica. The color of vermiculite is light gray or brown and is known to show pearl gloss. The vermiculite is easily decomposed in acids and has an increased positive-ion exchanging ability. When heated, the vermiculite gets expanded.

The vermiculite is a clay mineral whose chemical ingredients consist of CMg, $Fe_3+$ and $Al_3(Al,Si)_4O_{10}(OH)_2 \cdot 4H_2O$, namely hydrated silicate of aluminum, magnesium and iron. The vermiculite is 1 to 2 in hardness and 2.76 in specific gravity. The vermiculite is produced in a serpentinite zone and is extensively used as a heat-resistant material or a sound-proof material, because it is porous and highly absorptive.

Seventh Step: Kneading with Purified Water

All of the substances prepared and added in the first through sixth steps and 300 to 600 parts by weight of purified water are put into a kneader, thoroughly kneaded at a kneading speed of 50 to 500 rpm for 20 to 45 minutes, and left alone to age at a temperature of 25 to 50° C. for 1 to 5 hours, thus producing a dough-type cotton spray composition.

The longer the aging time becomes, the greater the degree of aging is. If the aging time exceeds five hours, however, the aging effect is sharply reduced as compared to the aging effect available when the aging is performed within five hours. This is why the aging within 1 to 5 hours is most preferred.

In other words, if the aging time exceeds five hours, it may become difficult to spray the cotton spray composition due to the solidification of the latter. If the aging time is less than one hour, a problem is posed in that the aging effect is reduced and the cotton fibers are insufficiently combined with other components of the cotton spray composition.

The cotton spray composition thus produced is put into a vinyl pack and is sprayed with a high-pressure sprayer after viscosity-controlling water is added thereto in a construction field, if necessary.

The cotton spray composition attached to an object was dried and the cotton fibers were microscopically observed. The observation revealed that pores for sound absorption, thermal insulation and prevention of dew condensation are formed between the fiber layers and further that the cotton fibers are strongly bonded to one another with an increased binding force.

As set forth above, the cotton spray composition is capable of expressing the natural texture of cotton fibers as they stands, thereby demonstrating a soft and natural indoor space.

Next, some experimental examples are presented for the sake of increased understanding of the present invention. It should be understood that these examples are given for illustration purposes but are not intended to limit the scope of the invention.

Example 1

Put into a kneader are: 100 parts by weight of cotton fibers having a length of 3 mm or less; 0.5 to 5 parts by weight of a microcapsule type phase change material having organic and inorganic coating layers, which is coated with a polymeric material as an organic material and then with an inorganic material; 0.5 to 1 parts by weight of a titanium dioxide photoactive catalyst; 0.5 to 2 parts by weight of at least one natural pigment selected from the group consisting of a pine needle powder, a green tea powder, a mugwort powder, an indigo plant powder, a gardenia powder, a charcoal powder and a yellow soil powder; 0.5 to 5 parts by weight of polyethylene oxide as a dispersant for preventing entanglement of the cotton fibers; 5 to 20 parts by weight of carboxyl methyl cellulose as a viscosity improver for urging the cotton fibers to be bonded together; 10 to 20 parts by weight of ammonium polyphosphate as an organic flame retardant; 5 parts by weight of pentaerythritol as a flame-retardation aid; 5 to 15 parts by weight of antimony oxide ($Sb_2O_5$) as an inorganic flame retardant; 0.5 to 3 parts by weight of an isothiazolin-based compound as an antimicrobial and antifungal agent; and 300 to 600 parts by weight of purified water. The mixture thus obtained was thoroughly kneaded at a kneading speed of 50 to 500 rpm for 20 to 45 minutes and was left alone to age at a temperature of 25 to 50° C. for 1 to 5 hours, thus producing a dough-type cotton spray composition.

The cotton spray composition thus produced was spray-coated on an object surface of the wall, ceiling or floor of a building with a prescribed thickness through the use of a high-pressure sprayer such as a spray gun or the like. As a result, it was possible to obtain a finishing material of natural texture superior in sound absorption, flame-retardation and thermal insulation performance.

Example 2

A cotton spray composition was produced in the same manner as in Example 1 except that 0.5 to 2 parts by weight of at least one substance selected from the group consisting of jasmine fragrance oil, green tea fragrance oil, lemon fragrance oil, baby powder fragrance oil and lavender fragrance oil is further added.

It was able to confirm that the fragrance oil thus added emits subtle perfume within an indoor area to which the cotton spray composition is applied. This makes it possible to create a pleasant living environment.

Example 3

A cotton spray composition was produced in the same manner as in Example 1 except that 10 to 20 parts by weight of Portland cement as an inorganic binding and curing agent is further added and mixed.

Example 4

A cotton spray composition was produced in the same manner as in Example 3 except that 5 to 10 parts by weight of at least one substance selected from the group consisting of a quartz monzonite powder, an illite powder, a yellow soil powder, a charcoal powder, a perlite powder and a vermiculite powder is further added.

As a result of addition of the curing agent and the substance such as a quartz monzonite powder, an illite powder, a yellow soil powder, a charcoal powder, a perlite powder or a vermiculite powder, the additives were evenly adsorbed to the cotton fibers, thus assisting in expressing the texture of natural materials.

The cotton spray compositions produced in Examples 1 through 4 were subjected to tests of moisture absorption and dissipation amount and tests of antimicrobial property. The test results are shown in Table 1 and Table 2.

TABLE 1

Moisture Absorption & Dissipation Test

| Kind of Test | Amount(gr/m$^2$) | Measurement Condition |
|---|---|---|
| Moisture Absorption | 193 | 25° C., RH 90% |
| Moisture Dissipation | 161 | 25° C., RH 50% |

TABLE 2

Antimicrobial Test

| Test Item | | Initial Concentration (CFU/40p) | Concentration After 24 hours (CFU/40p) | Bacteria Reduction Rate (%) | Test Method |
|---|---|---|---|---|---|
| Colon Bacilli | Blank | 403 | 2830 | — | KICM-FIR-1002 |
| | Invention | 403 | 40 | 90.1 | |
| Pseudomonas Aeroginosa | Blank | 418 | 2934 | — | |
| | Invention | 418 | 45 | 89.2 | |

Figure 2:
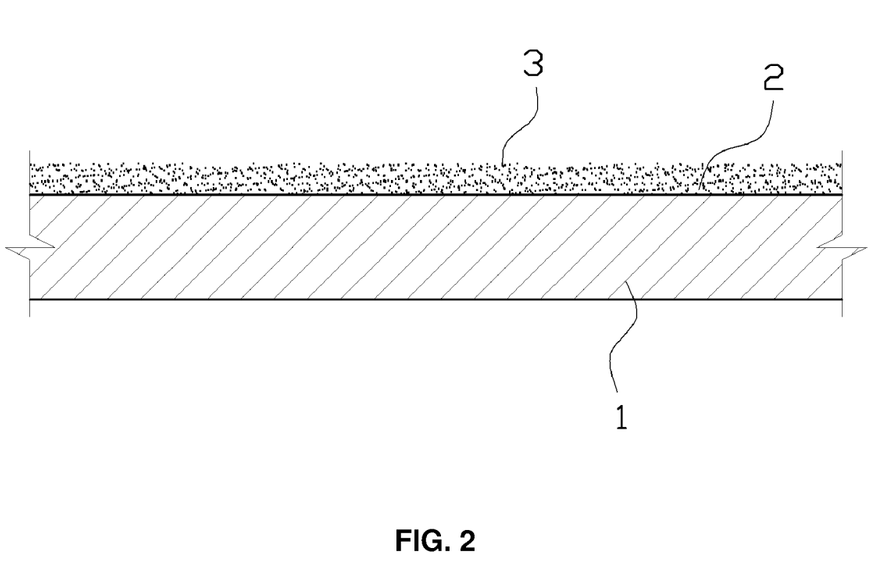
FIG. 2 is a section view showing a building material for use in interior decoration or exterior decoration in accordance with one embodiment of the present invention.

FIG. 2 is a section view showing a building material for use in interior decoration or exterior decoration in accordance with one embodiment of the present invention. The configuration of a building material using the cotton spray composition will now be described with reference to FIG. 2.

Examples of the building material using the cotton spray composition include a building material having a surface spray-coated with the cotton spray composition, a building material having a surface plastered with the cotton spray composition and a building material internally filled with the cotton spray composition.

The building material having a surface spray-coated with the cotton spray composition includes a substrate 1 and a cotton spray composition 2 spray-coated on the surface of the substrate 1 so that the building material can have a peculiar pattern layer 3.

In the manufacture of this building material, the surface of the substrate 1 is made planar and clean, after which cotton spray composition 2 is sprayed on the surface of the substrate 1 with a sprayer, such as a spray gun or the like, which is supplied with the cotton spray composition 2. The cotton spray composition 2 may be coated on the surface of the substrate 1 so as to form a desired pattern or may be sprayed once or more than two times without having to form any special pattern.

The building material having a surface plastered with the cotton spray composition includes a substrate and a cotton spray composition plastered on the surface of the substrate. The building material having a surface plastered with the cotton spray composition differs only in coating method from, and has the same configuration as, the building material having a surface spray-coated with the cotton spray composition.

The building material internally filled with the cotton spray composition includes a substrate with an internal space and a cotton spray composition filled in the internal space of the substrate.

In this regard, the substrate may be manufactured by extruding, injection-molding or otherwise shaping the cotton spray composition produced according to the inventive method. Then, the substrate thus manufactured may be spray-coated with or plastered with the afore-mentioned cotton spray composition, thereby producing a building material with the cotton spray composition.

While certain preferred embodiments of the invention have been described hereinabove, the present invention is not limited thereto. It should be understood that various changes and modifications may be made without departing from the scope of the invention defined in the claims.

What is claimed is:

1. A functional cotton spray composition, comprising: 100 parts by weight of cotton fibers having a length of 3 mm or less; 0.5 to 5 parts by weight of a phase change material in microcapsule form; 0.5 to 1 parts by weight of a titanium dioxide photoactive catalyst; 0.5 to 2 parts by weight of at least one natural pigment selected from the group consisting of a pine needle powder, a green tea powder, a mugwort powder, an indigo plant powder, a gardenia powder, a charcoal powder and a yellow soil powder; 0.5 to 5 parts by weight of a dispersant; 5 to 20 parts by weight of a viscosity improver; 10 to 20 parts by weight of an organic flame retardant; 5 to 15 parts by weight of an inorganic flame retardant; 0.5 to 3 parts by weight of an antimicrobial and antifungal agent; and 300 to 600 parts by weight of viscosity-controlling water.

2. The composition as recited in claim 1, further comprising 0.5 to 2 parts by weight of at least one substance selected from the group consisting of jasmine fragrance oil, green tea fragrance oil, lemon fragrance oil, baby powder fragrance oil and lavender fragrance oil.

3. The composition as recited in claim 1, further comprising 5 to 10 parts by weight of an inorganic binding and curing agent.

4. The composition as recited in claim 3, further comprising 5 to 10 parts by weight of at least one substance selected from the group consisting of quartz monzonite, illite, yellow soil, charcoal, perlite and vermiculite.

5. A method for producing a functional cotton spray composition, comprising:
a first step in which 100 parts by weight of cotton fibers having a length of 3 mm or less are prepared;
a second step in which 0.5 to 5 parts by weight of a phase change material in microcapsule form and 0.5 to 1 parts by weight of a titanium dioxide photoactive catalyst are added to and mixed with the cotton fibers;
a third step in which 0.5 to 2 parts by weight of at least one natural pigment selected from the group consisting of a pine needle powder, a green tea powder, a mugwort powder, an indigo plant powder, a gardenia powder, a charcoal powder and a yellow soil powder is added to and mixed with the cotton fibers;
a fourth step in which 0.5 to 5 parts by weight of a dispersant and 5 to 20 parts by weight of a viscosity improver are added to the cotton fibers to promote dispersion and binding of the cotton fibers;

a fifth step in which 10 to 20 parts by weight of an organic flame retardant and 5 to 15 parts by weight of an inorganic flame retardant are added to the cotton fibers;

a sixth step in which 0.5 to 3 parts by weight of an antimicrobial and antifungal agent as a functional additive is added to the cotton fibers; and a seventh step in which the substances prepared and added in the first through sixth steps and 300 to 600 parts by weight of purified water are put into a kneader, thoroughly kneaded at a kneading speed of 50 to 500 rpm for 20 to 45 minutes, and left alone to age at a temperature of 25 to 50° C. for 1 to 5 hours.

6. The method as recited in claim 5, further comprising, between the third and fourth steps, a step in which 0.5 to 2 parts by weight of at least one substance selected from the group consisting of jasmine fragrance oil, green tea fragrance oil, lemon fragrance oil, baby powder fragrance oil and lavender fragrance oil is added to and mixed with the cotton fibers.

7. The method as recited in claim 5, further comprising, between the sixth and seventh steps, a step in which 5 to 10 parts by weight of an inorganic binding and curing agent for binding and curing the cotton spray composition is added to and mixed with the cotton fibers.

8. The method as recited in claim 7, further comprising, after the curing agent adding step, a step in which 5 to 10 parts by weight of at least one substance selected from the group consisting of quartz monzonite, illite, yellow soil, charcoal, perlite and vermiculite is added to and mixed with the cotton fibers to generate far infrared rays helpful to a human body and capable of neutralizing toxic substances.

9. A building material provided with a cotton spray composition, wherein the cotton spray composition comprises: 100 parts by weight of cotton fibers having a length of 3 mm or less; 0.5 to 5 parts by weight of a phase change material in microcapsule form; 0.5 to 1 parts by weight of a titanium dioxide photoactive catalyst; 0.5 to 2 parts by weight of at least one natural pigment selected from the group consisting of a pine needle powder, a green tea powder, a mugwort powder, an indigo plant powder, a gardenia powder, a charcoal powder and a yellow soil powder; 0.5 to 5 parts by weight of a dispersant; 5 to 20 parts by weight of a viscosity improver; 10 to 20 parts by weight of an organic flame retardant; 5 to 15 parts by weight of an inorganic flame retardant; 0.5 to 3 parts by weight of an antimicrobial and antifungal agent; and 300 to 600 parts by weight of viscosity-controlling water.

10. The building material as recited in claim 9, wherein the cotton spray composition further comprises 0.5 to 2 parts by weight of at least one substance selected from the group consisting of jasmine fragrance oil, green tea fragrance oil, lemon fragrance oil, baby powder fragrance oil and lavender fragrance oil.

11. The building material as recited in claim 9, wherein the cotton spray composition further comprises 5 to 10 parts by weight of an inorganic binding and curing agent.

12. The building material as recited in claim 11, wherein the cotton spray composition further comprises 5 to 10 parts by weight of at least one substance selected from the group consisting of quartz monzonite, illite, yellow soil, charcoal, perlite and vermiculite.

13. The building material as recited in claim 9, wherein the cotton spray composition is spray-coated on a surface of the building material.

14. The building material as recited in claim 9, wherein the cotton spray composition is plastered on a surface of the building material.

15. The building material as recited in claim 9, wherein the cotton spray composition is filled inside the building material.

16. The building material as recited in claim 9, which is formed by extruding or injecting the cotton spray composition.

17. The building material as recited in claim 16, wherein the cotton spray composition is spray-coated on a surface of the building material.

* * * * *